United States Patent
Mishra et al.

(10) Patent No.: US 10,699,151 B2
(45) Date of Patent: Jun. 30, 2020

(54) SYSTEM AND METHOD FOR PERFORMING SALIENCY DETECTION USING DEEP ACTIVE CONTOURS

(71) Applicant: Miovision Technologies Incorporated, Kitchener (CA)

(72) Inventors: Akshaya K. Mishra, Kitchener (CA); Zhiming Luo, Sherbrooke (CA); Andrew J. Achkar, Waterloo (CA); Justin A. Eichel, Waterloo (CA)

(73) Assignee: Miovision Technologies Incorporated, Kitchener (CA)

(*) Notice: Subject to any disclaimer, the term of this patent is extended or adjusted under 35 U.S.C. 154(b) by 342 days.

(21) Appl. No.: 15/609,212

(22) Filed: May 31, 2017

(65) Prior Publication Data

US 2017/0351941 A1    Dec. 7, 2017

Related U.S. Application Data

(60) Provisional application No. 62/345,211, filed on Jun. 3, 2016.

(51) Int. Cl.
*G06K 9/46* (2006.01)
*G06N 3/04* (2006.01)

(52) U.S. Cl.
CPC ......... *G06K 9/4628* (2013.01); *G06N 3/0454* (2013.01)

(58) Field of Classification Search
None
See application file for complete search history.

(56) References Cited

U.S. PATENT DOCUMENTS 9,224,060 B1*   12/2015   Ramaswamy ..... G06K 9/00912
2005/0012817 A1*   1/2005   Hampapur ............. H04N 7/181
                                                            348/143

OTHER PUBLICATIONS

S. Munder, C. Schnorr and D. M. Gavrila, "Pedestrian Detection and Tracking Using a Mixture of View-Based Shape-Texture Models," in IEEE Transactions on Intelligent Transportation Systems, vol. 9, No. 2, pp. 333-343, Jun. 2008.doi: 10.1109/TITS.2008. 922943 (Year: 2008).*

Teramoto, A. , Fujita, H. , Yamamuro, O. and Tamaki, T. (2016), Automated detection of pulmonary nodules in PET/CT images: Ensemble false-positive reduction using a convolutional neural network technique. Med. Phys., 43: 2821-2827. doi:10.1118/1. 4948498 (Year: 2016).*

Li Yue, Liu Jie and Meng Lingjun, "Suspected pulmonary nodule detection algorithm based on morphology and gray entropy," 2011 IEEE International Conference on Computer Science and Automation Engineering, Shanghai, 2011, pp. 103-108.doi: 10.1109/CSAE.2011. 5952812 (Year: 2011).*

(Continued)

*Primary Examiner* — Chan S Park
*Assistant Examiner* — Elisa M Rice
(74) *Attorney, Agent, or Firm* — CPST Intellectual Property Inc.; Brett J. Slaney

(57) ABSTRACT

A system and method are provided for performing saliency detection on an image or video. The method includes training and creating deep features using deep neural networks, such that an input image is transformed into a plurality of regions, which minimizes intra-class variance, and maximizes inter-class variance, according to one or more active contour energy constraints. The method also includes providing and output associated with the deep features.

20 Claims, 8 Drawing Sheets

(56) References Cited

OTHER PUBLICATIONS

Balas C, Themelis G, Papadakis A, Vasgiouraki E, Argyros A, Koumandakis E, Tosca A and Helidonis E 2001 A novel hyperspectral imaging system: application on in-vivo detection and grading of cervical precancers and pigmented lesions Proc. Computer Vision Beyond the Visible Spectrum (Year: 2001).*
He, S., "SuperCNN: A Superpixelwise Convolutional Neural Network for Salient Object Detection", Int J Comput Vis (2015) 115:330-344 (Year: 2015).*
R. Peteri, T. RanchinMulti-resolution snakes for urban road extraction from Ikonos and Quickbird images23rd European Association of Remote Sensing Laboratories, Ghent, 2003 (2003) (Year: 2003).*
Chenyi Chen, Ari Seff, Alain Kornhauser, Jianxiong Xiao; "DeepDriving: Learning Affordance for Direction Perception in Autonomous Driving", The IEEE International Conference on Computer Vision (ICCV), 2015, pp. 2722-2730 (Year: 2015).*
Liu RX, Yao MH, Wang XB (2015) Defects detection based on deep learning and transfer learning. Metall Min Ind 7:312-321 (Year: 2015).*
Xu et al., "A Deep Convolutional Neural Network for segmenting and classifying epithelial and stromal regions in histopathological image", Neurocomputing, vol. 191, May 26, 2016, pp. 214-223 (Year: 2016).*
Asmatullah et al., "Automatic Active Contour-Based Segmentation and Classification of Carotid Arter Ultrasound Images", J Digit Imaging, Dec. 2013; 266(6): 1071-1081 (Year: 2013).*
Guo et al.; "A Novel Multiresolution Spatiotemporal Saliency Detection Model and Its Applications in Image and Video Compression"; IEEE Transactions on Image Processing; vol. 19, No. 1; Jan. 2010; pp. 185 to 198.
Li, G. et al.; "Visual Saliency Based on Multiscale Deep Features"; IEEE Conference on Computer Vision and Pattern Recognition (CVPR), 2015.
Zhao, R. et al.; "Saliency Detection by Multi-Context Deep Learning"; IEEE Conference on Computer Vision and Pattern Recognition (CVPR), 2015.
Vese, L.A. et al. "A Multiphase Level Set Framework for Image Segmentation Using the Mumford and Shah Model"; International Journal of Computer Vision; vol. 50, No. 3; 2002; pp. 271 to 293.
Malladi, R. et al.; "Shape Modeling with Front Propagation: A Level Set Approach"; IEEE Transactions on Pattern Analysis and Machine Intelligence; vol. 17, No. 2; Feb. 1995; pp. 158 to 175.
Chan, T.F. et al.; Active Contours Without Edges; IEEE Transactions on Image Processing; vol. 10, No. 2; Feb. 2001; pp. 266 to 277.
Kass, M. Snakes: Active Contour Models; International Journal of Computer Vision; vol. 1, No. 4; 1988; pp. 321 to 331.
Mumford, D. et al.; "Optimal Approximations by Piecewise Smooth Functions and Associated Variational Problems"; Communications on Pure and Applied Mathematics; vol. 52, No. 5; Jul. 1989; pp. 577 to 685.
Krizhevsky, A. et al.; "ImageNet Classification with Deep Convolutional Neural Networks"; Neural Information Processing Systems Conference (NIPS); 2012.
Bengio, Y. et al.; "Representation Learning: A Review and New Perspectives"; IEEE Transactions on Pattern Analysis and Machine Intelligence; vol. 3, No. 8; Aug. 2013; pp. 798 to 1828.
Lecun, Y. et al.; "Deep learning"; Nature; vol. 521, No. 7553; May 2015; pp. 436 to 444.
Weston, J. et al.; Neural Networks: Tricks of the Trade: Second Edition, Chapter 26, "Deep Learning Semi-Supervised Embedding"; 2012; Springer Berlin Heidelberg; pp. 639 to 655.
Wang. L. et al.; "Deep Networks for Saliency Detection via Local Estimation and Global Search"; IEEE Conference on Computer Vision and Pattern Recognition (CVPR), 2015.
Zhang, S. et al.; "Conditional Random Fields as Recurrent Neural Networks"; . IEEE Conference on Computer Vision (ICCV), 2015.
Liu, T. et al."Learning to Detect a Salient Object"; IEEE Transactions on Pattern Analysis and Machine Intelligence; vol. 33, No. 2; Feb. 2011; pp. 353 to 367.
Li, Y. et al.;"The Secrets of Salient Object Segmentation"; IEEE Conference on Computer Vision and Pattern Recognition (CVPR), 2014.
Yang, C. et al.; "Saliency Detection via Graph-Based Manifold Ranking"; IEEE Conference on Computer Vision and Pattern Recognition (CVPR), 2013.
Krähenbühl, P. et al.; "Geodesic Object Proposals"; European Conference on Computer Vision, 2014.
Long, J. et al. "Fully Convolutional Networks for Semantic Segmentation"; IEEE Conference on Computer Vision and Pattern Recognition (CVPR), 2015.
Simonyan, A. et al.; "Very Deep Convolutional Networks for Large-Scale Image Recognition"; ICLR; CoRR, abs/1409.1556; Apr. 2015.
Kingma, D. et al.; "A method for Stochastic Optimization"; ICLR; arXiv preprint arXiv:1412.6980; Jul. 2015.
Achanta, R. et al.; "Frequency-tuned Salient Region Detection"; IEEE Conference on Computer Vision and Pattern Recognition (CVPR), 2009.
Perazzi, F. et al.; "Saliency Filters: Contrast Based Filtering for Salient Region Detection"; IEEE Conference on Computer Vision and Pattern Recognition (CVPR), 2012.
Qin, Y. et al.; "Saliency Detection via Cellular Automata"; IEEE Conference on Computer Vision and Pattern Recognition (CVPR), 2015.
Shafiee, M. J. et al.; "Evolutionary Synthesis of Deep Neural Networks via Synaptic Cluster-driven Genetic Encoding"; Nov. 22, 2016; https://arxiv.org/abs/1609.01360v2.

* cited by examiner

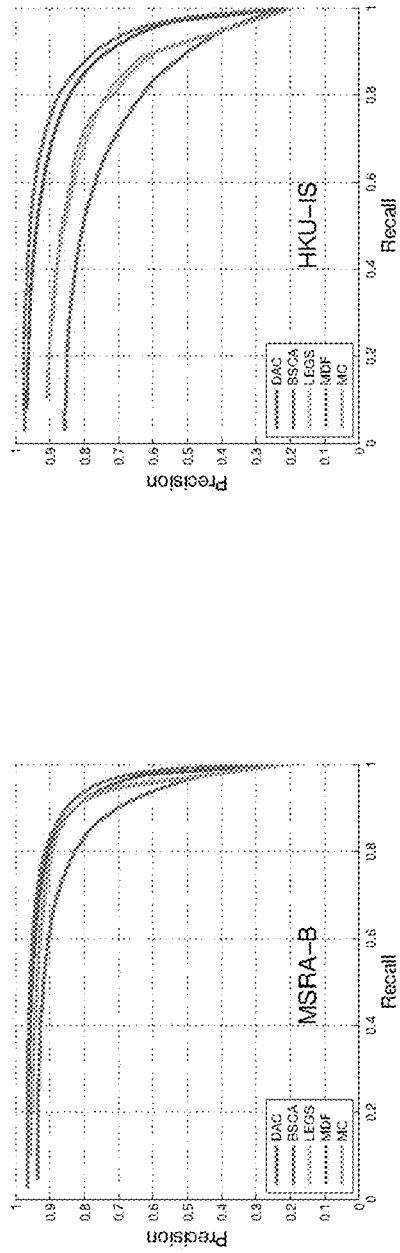
FIG. 2(a)
FIG. 2(b)
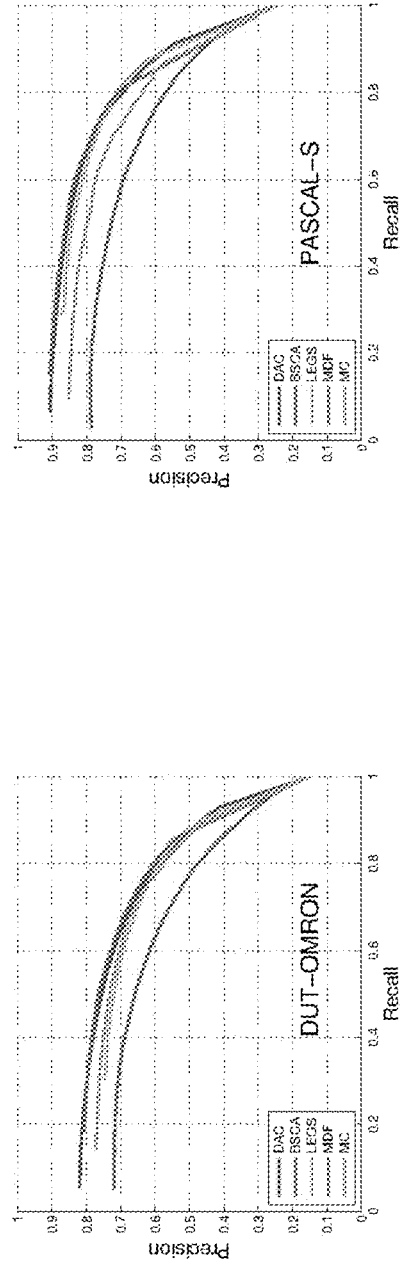
FIG. 2(c)
FIG. 2(d)

SYSTEM AND METHOD FOR PERFORMING SALIENCY DETECTION USING DEEP ACTIVE CONTOURS

CROSS-REFERENCE TO RELATED APPLICATION(S)

This application claims priority to U.S. Provisional Patent Application No. 62/345,211 filed on Jun. 3, 2016, the contents of which are incorporated herein by reference.

TECHNICAL FIELD

The following relates to systems and methods for saliency detection, in particular using deep active contours.

DESCRIPTION OF THE RELATED ART

Saliency detection is an important computer vision problem which has applications in image and video compression [1], context aware image re-targeting [2] and scene parsing [3]. Among several saliency detection methods, non-parametric active contours (deformable models), characterized by a level set function [4, 5], are widely used [4, 6]. Unlike parametric models [7], non-parametric models naturally handle multiple topologies [5, 6], and are thus capable of identifying multiple salient regions in an image.

Over the past few decades, a wide range of active contour methods have been developed [4, 6, 7, 8]. Despite much effort, these methods are found to have important drawbacks, for example: sensitivity to initial solutions, boundary leakage, a large number of parameters to tune, sensitivity to local minima caused by noise, poor convergence rates, and image intensity as the only data term.

The recent rise of deep neural networks in machine learning [9, 10, 11] has demonstrated their improved object classification and detection performance as compared to classical approaches. Although deep learning methods have shown tremendous success, applying deep neural networks to image segmentation and salient region detection tasks remains a challenging and active research area. Recently, numerous efforts to perform saliency detection with deep learning methods have been presented, for instance by incorporating class-specific global features as a regularization term [12] and the use of new multi-scale [2], multi-stage [13], and multi-context [3] deep network architectures. A conditional random field model, implemented as a recurrent neural network, that ensures label compatibility and smoothness (at the global level) was also recently developed for segmentation tasks [14].

To achieve state-of-the-art performance on saliency detection tasks, such models may require non-trivial steps such as generating object proposals, applying post-processing or defining complex network architectures, all the while producing predictions normally found to be much slower than real-time.

It is an object of the following to address the above-noted challenges.

SUMMARY

The following provides a simplified approach to saliency detection, which uses a deep active contour (DAC) model that is end-to-end trainable. In the DAC model, the total energy (cost function) can be formulated using the traditional active contours model by Chan and Vese, but using features learned by a deep network rather than image RGB intensities.

This approach can capture both local and global contexts while maintaining a simple network architecture that achieves fast evaluation speeds. Specifically, the DAC model has been found to be capable of evaluating an input image in 0.1 s, a speed gain of 16 to 80 times as compared to other deep learning methods, while maintaining or improving upon evaluation performance on the MSRA-B [15], PASCAL-S [16], DUT-OMRON [17] and HKU-IS [2] benchmark datasets.

In one aspect, there is provided a method of performing saliency detection on an image or video, the method comprising: training and creating deep features using deep neural networks, such that an input image is transformed into a plurality of regions, which minimizes intra-class variance, and maximizes inter-class variance, according to one or more active contour energy constraints; and providing and output associated with the deep features.

In other aspects, there are provided computer readable media and computer visions systems and applications adapted to perform the method.

BRIEF DESCRIPTION OF THE DRAWINGS

Embodiments will now be described by way of example only with reference to the appended drawings wherein:

FIGS. 2(a), 2(b), 2(c), and 2(d) are graphs illustrating precision-recall curves for the presently described DAC model compared to other methods using available datasets;

DETAILED DESCRIPTION

Figure 1:
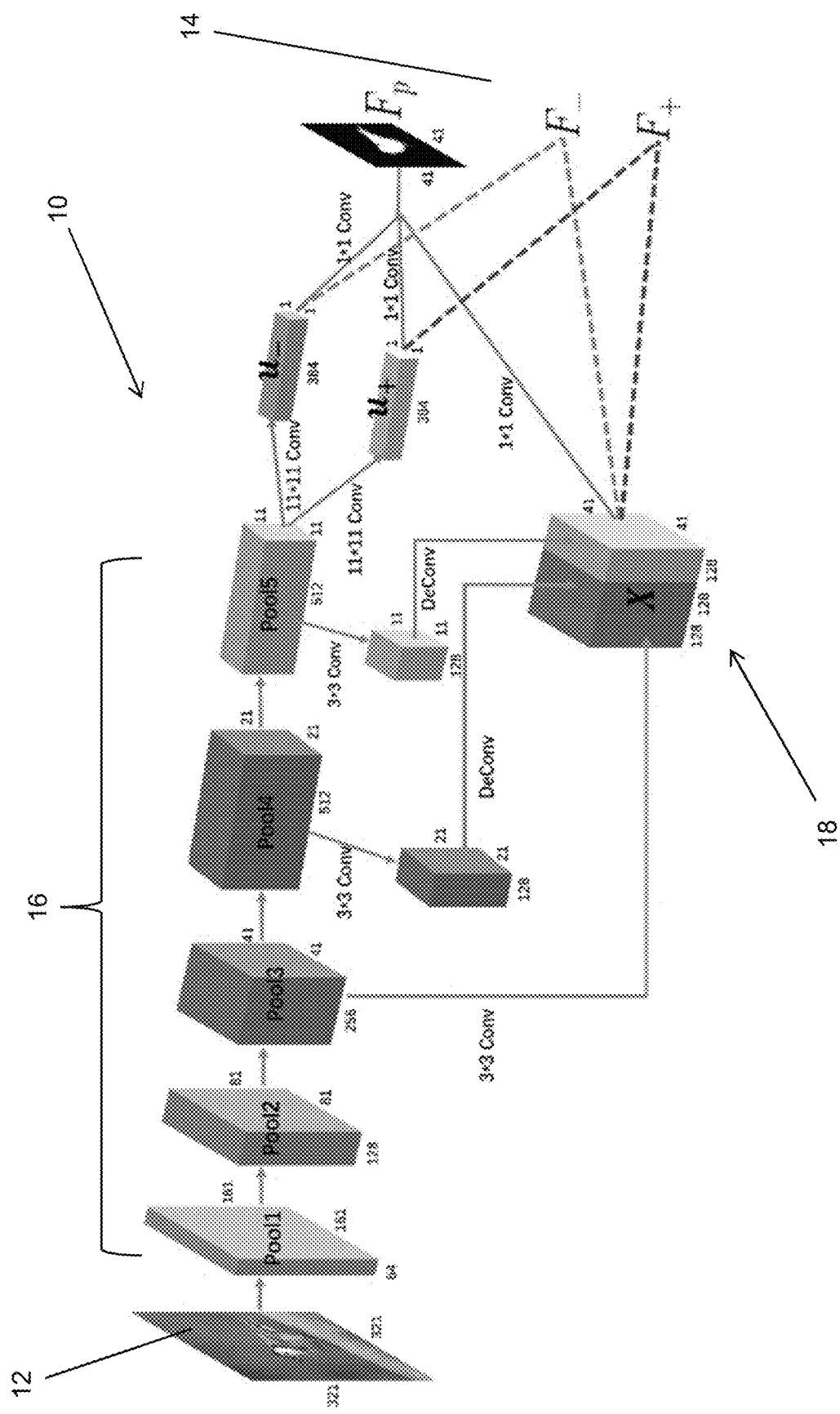
FIG. 1 is a schematic diagram illustrating a DAC network architecture.

Saliency detection is an important computer vision task aimed at highlighting relevant portions of a scene. It has been found that existing methods of saliency detection using conventional active contour models can struggle with real-world images, whereas deep neural net approaches suffer from excess complexity and slow evaluation speeds.

To balance these competing objectives, the following provides a simplified deep active contour method that combines aspects of active contour models with the deep feature representations of neural networks. The model has been trained on the MSRA-B training set using a cost function motivated by the traditional active contour fitting energy. Testing on the MSRA-B, PASCAL-S, DUT-OMRON, and HKU-IS benchmarks have been conducted, and demonstrate its performance to be on par or better than other state-of-the-art saliency detection methods. With a computation time of 0.1 s/image, the method described herein can be 16 to 80 times faster than existing methods, enabling near real-time, high performance saliency detection.

The method described herein incorporates a deep active contour (DAC) model derived from traditional, model-based approaches to saliency detection. A summary of the theory of such active contours [6] is provided below, followed by a comparison with some more recent deep learning based efforts to detect salient regions in images.

Model Based Saliency Detection

Salient region detection as well as image segmentation can be considered as the optimization of a non-convex energy functional, which typically consists of a data term and a regularization term. An elegant mathematical global model is the Mumford-Shah (MS) model [8], whose fitting energy, $$F^{MS} = \underbrace{\sum_j \lambda_j \iint_{(x,y)\in \Omega} |I - u_j|^2 dxdy}_{\text{data fidelity}} + \underbrace{\sum_j B_j \iint_{(x,y)\in \Omega \setminus C} |u'_j|^2 dxdy}_{\text{region uniformity}} + \underbrace{\gamma \oint_{(x,y)\in C} dxdy}_{\text{boundary length}}, \quad (1)$$

segments an image I as a set of disjoint piece-wise linear functions $u_j$, indexed by j. Here, $\Omega \subset R^N$ is an open set representing the image domain, I is the observed image, $u_j$ is the underlying piece-wise linear segmented image, $u'_j$ is the first derivative of $u_j$ with respect to I, and C is the boundary of the segmented regions. The positive weighting constants $\lambda_j$, $\beta_j$ and $\gamma$ tune the multi-criteria energy function in terms of data fidelity, region uniformity, and total boundary length.

Given these three terms, the MS model provides the theoretical basis for the segmentation of an image into a set of piece-wise linear regions. Although the MS model is theoretically appealing, from a practical perspective, the minimization of Eq. 1 has been found to be challenging. Chan-Vese has simplified the MS model by approximating the image I using two uniform regions: background (−) and foreground (+) [6]. The foreground regions are termed as salient regions. The total fitting energy of the Chan-Vese model is expressed as:

$$F(u_+, u_-, C) = \underbrace{\lambda_- \iint_{(x,y)\in \Omega_-} |I - u_-|^2 dxdy + \lambda_+ \iint_{(x,y)\in \Omega_-} |I - u_+|^2 dxdy}_{\text{data fidelity}} + \underbrace{\gamma \oint_{(x,y)\in C} dxdy}_{\text{boundary length}} \quad (2)$$

Here, the Chan-Vese constraints have made the region uniformity term zero (by enforcing uniform foreground and background regions, u'=0), and split the data fidelity term into foreground and background terms.

A common approach to minimizing this energy is the level set based curve evolution technique. Despite the mathematical elegance of this approach, active contours initialized far from the true solution often fail to find the required visual saliency in the presence of noise, background clutter, weak image boundaries or image non-uniformity. Furthermore, poor convergence rates in the iterative solution of the level set limits their utility to non-real-time applications.

Deep Learning for Visual Saliency Detection

In recent years, deep neural network (DNN) based learning techniques have found to outperform classical computer vision methods in visual recognition tasks such as object classification and localization [9, 10, 11]. To perform such tasks, DNNs typically use local patch-based features that have a limited ability to capture global relationships between objects in a scene. Recently, a number of deep learning techniques have been developed to make better use of the global relationships needed for visual saliency detection tasks [2, 13, 3]. A common aspect of such models is an attempt to incorporate both fine- and coarse-grained details into the model structure.

For instance, Zhao et al. [3] integrated the global and local context of an image into a single, multi-context (MC) network, where the global context helps to model the saliency in the full image and the local context helps to estimate the saliency of fine-grained feature-rich areas. While being an effective saliency detection method, the performance of the MC method is tied to the performance of the chosen superpixel method, which can often be computationally expensive. Li et al. [2] developed a computational model using multi-scale deep features extracted by three convolutional neural nets (CNNs) and three fully connected layers to define salient regions of an image. Such a complex network model was designed to capture the saliency map of objects with various scales, geometry, spatial positions, irregularities, and contrast levels. Wang et al. [13] developed a two tier strategy: each pixel is assigned a saliency based upon a local context estimation in parallel with a global search strategy used to identify the salient regions. These two saliency maps are then combined using geodesic object proposal techniques [18].

These DNN-based saliency detection methods aimed to achieve state-of-the-art saliency detection by redesigning the DNN architecture and either adopting multi-scale, hierarchical structures, using superpixel based segmentation or fusing together information with local and global contexts. While these architectures have been found to deliver notable performances, their complexity precludes their use in real-time applications, with computation times of, e.g., 1.6 to 8 seconds per image.

In contrast, the DAC formulation described herein provides a simpler approach that has been found to maintain the saliency detection performance of these other methods while improving the computational efficiency. As discussed below, the gains in speed come from a model that uses a cost function inspired by the fitting energy of the Chan-Vese model and replaces the raw pixel intensities with deep local and global features extracted from a DNN.

Deep Active Contours

This section formulates the DAC principles, which in the examples described, apply the simplicity of the Chan-Vese model to non-uniform foreground and background regions using a deep neural network framework. Moreover, the speed of the DAC method can be increased by reducing the size of the neural network. In one embodiment, this can be done by keeping the same number of layers while strategically reducing the depth of the filters without sacrificing quality to thus reduce the size of the neural network. This has been found to allow the neural network to be represented at 10% to 1% of the original computational and structural size and the resulting network can be run between 10 and 100 times faster, due to requiring fewer computations. Additionally, such a solution can be implemented on hardware with lower power consumption with a negligible drop in the original accuracy of the network in order to analyze images. This allows for the software for the DAC to be implemented on a device instead of, for example, requiring the code to be executed in the cloud or on another larger platform. The details of such a neural network reduction can be found in U.S. Provisional Patent Application No. 62/362,834 or Shafiee, Mohammed Javad and Wong, Alexander, "*Evolutionary Synthesis of Deep Neural Networks via Synaptic Cluster-driven Genetic Encoding*" [v2], Cornell University Library, Nov. 22, 2016; the contents of which are incorporated herein by reference in their entirety.

Problem Formulation

Saliency detection, which incorporates both local and global information, has been found to be successful [13, 3]. However, the question of how to most effectively combine these features is to be addressed. The DAC approach described herein considers the replacement of raw red-green-blue (RGB) intensities, used in the conventional Chan-Vese model (Eq. (2)), with deep representations of local and global features provided by a DNN, recasting the Chan-Vese fitting energy into a cost function that can be optimized using backpropagation. The DAC approach provides a framework for defining both a cost function and a DNN architecture.

It has been found that one downside of conventional active contours, when applied to real-world images, is that heterogeneity in the raw pixel intensity space limits image separability into uniform foreground and background regions. By applying the Chan-Vese model to deep features instead, the method described herein identifies a higher dimensional space in which the foreground and background regions exhibit homogeneity and thus separability. A set of transformations that may transform the raw pixel intensity space into such a separable space may be represented as a DNN that transforms the input image I into a higher dimensional space X using a transformation T. T can be represented as a vector of cascading non-linear transformations, $$X=T(I) \text{ with } T(I)=[T_d(T_{d-1} \ldots (T_0(I))), \ldots, T_1(T_0(I)), T_0(I)]^T, \quad (3)$$

$$T_d(x)=h(w_d \otimes x+b_d),$$

where $T_d$ denotes a convolution, $\otimes$, at depth d with weights $w_d$, biases $b_d$ and an activation function h. After each transformation, either a deconvolution or a pooling operation is performed.

Since the presently described model has no knowledge of the distribution of background and foreground samples in the high-dimensional space, rather than using the conventional maximum-likelihood mean estimator of the Chan-Vese model, one can choose to learn the global mean of background and foreground regions using two CNN transformations $G_+$ and $G_-$, $$u_+=G_+(I) \text{ and } u_-=G_-(I). \quad (4)$$

These estimated means, $u_+$ and $u_-$, capture the global information content of an image. In the presently described case, $u_+$ and $u_-$ are feature vectors located at the end of the network as shown in FIG. 1. Following the Chan-Vese model, the data-fidelity term of Eq. (2) can be computed by taking the Euclidean distance between the estimated mean and the feature vectors. However, the mean vector and feature vector lie in a high dimensional space, making Euclidean distance a poor distance metric. Instead, one can choose to learn a distance metric $f_\pm$ between the local feature $x_i \in X$, computed using Eq. (3) at each of its pixels i, and the global features $u_\pm$, $$f_+(x_i, u_+)=(A_+\cdot(x_i-u_+)+B_+)_2, f_-(x_i, u_+)=(A_-\cdot(x_i-u_-)+B_-)^2. \quad (5)$$

The summation of these terms over all pixels done in Eq. (7)—see below—replaces the data fidelity term in Eq. (2). It may be noted that $A_\pm$ and $B_\pm$ are weights and biases learned during training that allow one to compute this distance metric.

One way to implement the boundary length term in Eq. (2) would be to minimize errors in the predicted boundary length relative to the ground truth. However, the ground truth saliency map already implicitly contains a minimal boundary, so this would not necessarily be needed. Instead, one can opt to use a cross-entropy loss on the class labels as an alternative to directly minimizing the boundary length. This produces an effective boundary length term that we implemented using a softmax function. This computes each pixel's predicted class (c) probability, $\hat{p}_i^c$, as $$\hat{p}_i^c = p(y_i = c \mid x_i, u_+, u_-) = \frac{e^{w_X^c x_i + b_X^c + w_+^c u_+ + b_+^c + w_-^c u_- + b_-^c}}{\sum_{c' \in \{+,-\}} e^{w_X^{c'} x_i + b_X^{c'} + w_+^{c'} u_+ + b_+^{c'} + w_-^{c'} u_- + b_-^{c'}}}, \quad (6)$$

where $W_X(b_X)$, $w_+(b_+)$, and $w_-(b_-)$ correspond to the weights (biases) applied to the local features (X) and global features ($u_+$, $u_-$), and $y_i \in \{+, -\}$ is a class label at pixel i.

The cost function, F(I), of the DAC model is then defined by the summation of the data fidelity terms (Eq.(5)) and the effective boundary length term (Eq.(6)) over the saliency map pixels i:

$$F(I) = \underbrace{\lambda_- \sum_{i \in -} f_-(x_i, u_-)}_{F_-} + \underbrace{\lambda_+ \sum_{i \in +} f_+(x_i, u_+)}_{F_+} + \underbrace{\gamma \sum_i \sum_{c \in \{+,-\}} -\hat{p}_i^c \cdot \log(\hat{p}_i^c)}_{F_p},$$

where the data fidelity terms are denoted $F_\pm$ and the boundary length term $F_p$. F(I) is minimized end-to-end by optimizing its parameters using back-propagation on a DNN architecture. This DAC loss function (Eq. (7)) is analogous to the classical Chan-Vese fitting energy (Eq. (2)).

An example implementation for a network architecture 10 is shown in FIG. 1. This architecture 10 is designed to implement each component of Eq. (7). The network accepts an input image 12 with fixed input size (e.g., of 321×321) and produces an output 14, including a saliency map ($F_p$) the background objects ($F_-$) and foreground objects ($F_+$), with a particular spatial resolution (e.g., of 41×41).

First, the image 12 enters a series of input layers 16. Then, similar to the FCN-8s model, the outputs from the VGG-16 model's Pool3, Pool4 and Pool5 layers are combined to compute local features at multiple scales. In this example, a convolution layer is added to each of the outputs of the Pool3, Pool4 and Pool5 layers each having 128 filters of kernel size 3×3. For the Pool4 and Pool5 channels, a deconvolution layer is added to produce a spatial size equal to the 41×41 saliency map 14. These three outputs are then concatenated together (Eq. (3)), forming an output that represents the local features X as shown by numeral 18 in FIG. 1.

To incorporate data from the entire image, the global features $u_+$ and $u_-$ (Eq. (4)) are calculated in parallel to X from Pool5 layer's output. Two fully connected layers, implemented using 11×11 convolutions for practical purposes, were added after the Pool5 layer with output depth equal to that of X. The class probabilities are then calculated by:

1) fusing the global and local features through the application of three individual 1×1 convolutions to X, $u_+$ and $u_-$,
2) aggregating these three convolution layers, and
3) applying a softmax activation function, as in Eq. (6).

This provides the effective boundary length term $F_p$ 14 of Eq. (7).

The data fidelity terms $F_+$ and $F_-$ can be calculated as follows.

First, $u_+$ and $u_-$ are subtracted from X for each spatial location, i. Then, the projected distance (Eq. (5)) is computed using two separate 1×1 convolutions followed by a square operation, giving $F_+$ and $F_-$. The output layers of this DNN can then be seen to produce $F_p$, $F_-$, and $F_+$, which are summed to compute F(I), as in Eq. (7). It may be noted that during testing, the 41×41 saliency maps can be resized to the original 321×321 input image size, whereas for training the ground truth label of each image can be resized to 41×41.

As can be appreciated from FIG. 1, the local features are contained in X, which is a concatenation of outputs from layers at different depths of the network. Deeper layers are deconvolved to produce 41×41 outputs. The mean vectors $u_+$ and $u_-$, corresponding to foreground (+) and background (−) regions, are constructed using features from the whole image, providing global context. The final saliency map incorporates both local and global features. The dashed lines in FIG. 1 show feature combinations used for training with the DAC cost function $F(I)=F_-+F_++F_p$ (see Eq. (7)).

Experimental Results and Analysis

Benchmark Datasets

Four different public benchmark datasets have been used to evaluate the performance of the presently described method, namely: MSRA-B [15], PASCALS [16], DUT-OMRON [17] and HKU-IS [2]. The MSRA-B dataset contains 5000 images, most of which contain only one salient object. The PASCALS dataset contains 850 natural images which were built from the validation set of the PASCAL-VOC 2010 segmentation challenge. This dataset contains both pixel-wise saliency ground truth and eye fixation ground truth. The DUT-OMRON dataset has 5168 images, each of which containing one or more salient objects with clutter in the background. The HKU-IS dataset is a recent saliency dataset that contains 4447 images, most of which have low contrast and multiple salient objects.

Implementation and Experimental Setup

The presently described model was implemented using TensorFlow (0.7.1). All the weights of new convolutional layers were initialized randomly with a truncated normal ($\sigma=0.01$). Pre-trained weights were used for the VGG-16 layers. The biases were initialized to 0. The Adam optimizer was used to train the model with an initial learning rate of $10^{-4}$, $\beta_1=0.9$, and $\beta_2=0.999$. The regularization parameters $\lambda_+$, $\lambda_-$, and $\gamma$ in Eq. (7) were set to 1. The model was trained end-to-end on the MSRA-B training set for 20 epochs with single image batches. With a NVIDIA TITAN X GPU, training takes ~8 hours.

For fair comparison with other methods, the experimental setup of [2] was followed, dividing the MSRA-B dataset into 3 parts: 2500 images for training, 500 images for validation and the remaining 2000 images for testing. Using the trained DAC model, the saliency maps were also computed for three other benchmark datasets to test how well the model generalizes.

Evaluation Metrics

Precision-recall curves and the $F_\beta$ measure were used to evaluate the performance of saliency detection. The precision-recall curve is computed by binarizing the saliency maps under different probability thresholds ranging from 0 to 1. As for the $F_\beta$ measure, it is defined as, $$F_\beta = \frac{(1+\beta^2) \cdot \text{Precision} \cdot \text{Recall}}{\beta^2 \cdot \text{Precision} \cdot \text{Recall}} \quad (8)$$

where $\beta^2=0.3$ to emphasize precision over recall as suggested in [22]. In addition, for a given image of width W and height H, the mean absolute error (MAE) is another widely used evaluation metric that computes the average pixel-wise absolute difference between the labelled ground truth L and the estimated saliency probability map S, $$MAE = \frac{1}{W \times H} \sum_{x=1}^{W} \sum_{y=1}^{H} |S(x,y) - L(x,y)|. \quad (9)$$

The presently described DAC method was then quantitatively compared against 4 recent state-of-the art methods: BSCA [24], LEGS [13], MC [3] and MDF [2]. Precision-recall curves are shown in FIGS. 2(a) to 2(d), and the optimal $F_\beta$ and MAE scores are in Table 1 below.

FIGS. 2(a) to 2(d) provides precision-recall curves for the DAC model compared to LEGS[13], BSCA[24], MDF[2], and MC[3] evaluated on the MASR-B, HKU-IS, DUT-OMRON and PASCAL-S benchmark datasets. The DAC model compares favorably against these other methods on all four datasets.

LEGS, MC and MDF are the latest deep learning based saliency detection methods. It may be noted that since part of the HKU-IS dataset was used to train the MDF model [2], one only computes the evaluation metrics on the testing set of HKU-IS. A visual comparison of the saliency maps is provided in FIG. 3. All saliency maps of other methods shown here were either computed using the inventors' code or represent pre-computed saliency maps.

The average computation time for generating the saliency map of one image in Table 1 was compared with LEGS [13], MC [3] and MDF [2]. For these 3 deep learning based methods, the processing time reported in their papers on an NVIDIA TITAN Black GPU were used. For this comparison, the presently described DAC model was also tested on an NVIDIA TITAN Black GPU. It may be noted that all methods take input image dimensions of around 300×300 pixels. On average, the DAC model processes an image in 0.1 s (10 images/s).

As shown in Table 1 below, the DAC model presented here achieves similar (or better) quantitative $F_\beta$ and MAE performance as compared to BSCA [24], LEGS [13], MC [3], and MDF [2]. The only method that is systematically equivalent to the DAC method is MDF [2], but this method has processing times 80× longer in these experimental findings. In fact, it was found that the DAC method can reduce processing times by a factor of 16 to 80 times relative to these methods, bringing it close to real-time speed.

TABLE 1

Quantitative Performance of DAC Model

| Dataset | Metric | BSCA [24] | LEGS [13] | MC [3] | MDF [2] | DAC |
|---|---|---|---|---|---|---|
| MSRA-B | $F_\beta$ | 0.830 | 0.870 | 0.872 | 0.885 | 0.877 |
|  | MAE | 0.130 | 0.081 | 0.056 | 0.104 | 0.074 |
| HKU-IS | $F_\beta$ | 0.723 | 0.770 | 0.782 | 0.861 | 0.841 |
|  | MAE | 0.174 | 0.118 | 0.097 | 0.129 | 0.084 |

TABLE 1-continued

Quantitative Performance of DAC Model

| Dataset | Metric | BSCA [24] | LEGS [13] | MC [3] | MDF [2] | DAC |
|---------|--------|-----------|-----------|--------|---------|-------|
| DUT-OMRON | $F_\beta$ | 0.616 | 0.669 | 0.678 | 0.694 | 0.688 |
|  | MAE | 0.191 | 0.133 | 0.094 | 0.092 | 0.105 |
| PASCAL-S | $F_\beta$ | 0.669 | 0.756 | 0.728 | 0.768 | 0.764 |
|  | MAE | 0.224 | 0.157 | 0.149 | 0.145 | 0.145 |

As such, Table 1 summarizes the quantitative performance of the presently described DAC model on 4 benchmark datasets compared with the BSCA[24], LEGS [13], MC[3], and MDF[2] models. The latter three are deep learning methods and the former is not. The $F_\beta$ and MAE metrics are defined in the text.

Figure 3:
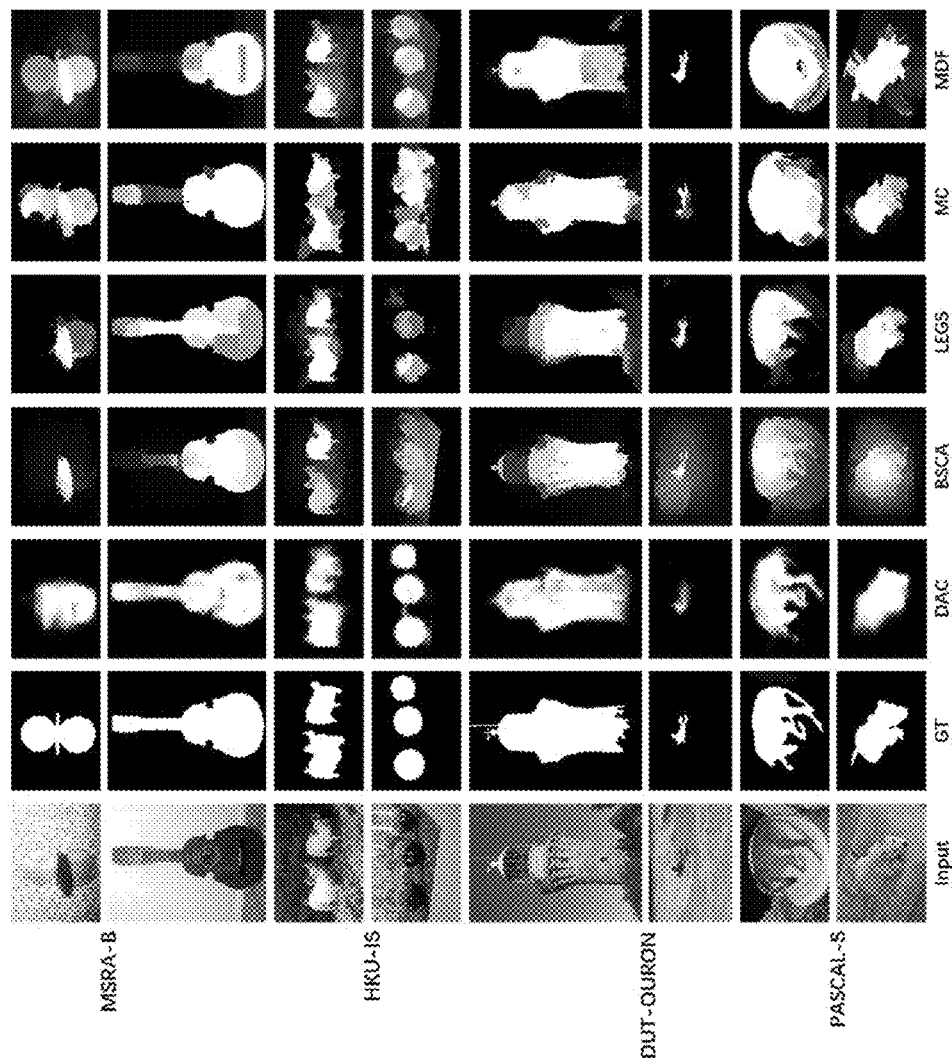
FIG. 3 provides a series of saliency maps comparing the presently described DAC method to prior methods.

In addition, the DAC model has been found to deliver improved qualitative visual saliency maps, as shown in FIG. 3. Since the DAC model uses both local and global features in its optimization of the Chan-Vese inspired cost function, its saliency maps tend to reliably capture the overall shape of an object while maintaining good region uniformity. In contrast, the non-deep-learning based BSCA method [24] often labels background clutter as salient (e.g., surfer, dogs in FIG. 3) and can miss the upper or lower portions of the salient region (e.g. coins, guitar in FIG. 3). Meanwhile, the deep learning based methods LEGS [13], MC [3] and MDF [2] often provide a multi-modal distribution of the salient region for images with non-uniform contrast (e.g., guitar, pigs, balls in FIG. 3).

Table 2 below summarizes execution times to generate a saliency map. Three leading deep learning methods are compared to the presently described DAC method.

TABLE 2

Execution times

| | LEGS[13] | MC[3] | MDF[2] | DAC |
|---|---------|-------|--------|-----|
| time/image (s) | 2 | 1.6 | 8 | 0.1 |

In some cases, the DAC method did not capture high curvature regions of an object, similar to conventional active contours based techniques. For example, the tail of the dogs and the rod at the top of the lighthouse (see FIG. 3) are missed by the DAC model. Additionally, the increase in cost associated with differences between local and global features in the DAC cost function hinders its ability to find very small salient regions.

To overcome these limitations, the DAC model can be extended to multi-object saliency detection by following the principles of multi-phase level set functions, where the cost function of the DAC can be split into object-specific data terms.

Summary

The above provides a simple, yet effective method that uses DACs for saliency detection. This model can be optimized using the principles of the classical Chan-Vese model to construct a multi-level cost function suitable for deep learning.

A neural network architecture that produces deep features compatible with this cost function was implemented in TensorFlow. The DAC method has been shown to quantitatively match or outperform the four leading saliency detection methods while producing saliency maps 16 to 80 times faster at near real-time speeds. Qualitatively, the visual saliency maps of the DAC method appear to demonstrate better region uniformity than the other methods.

Additional Embodiment

Figure 4:
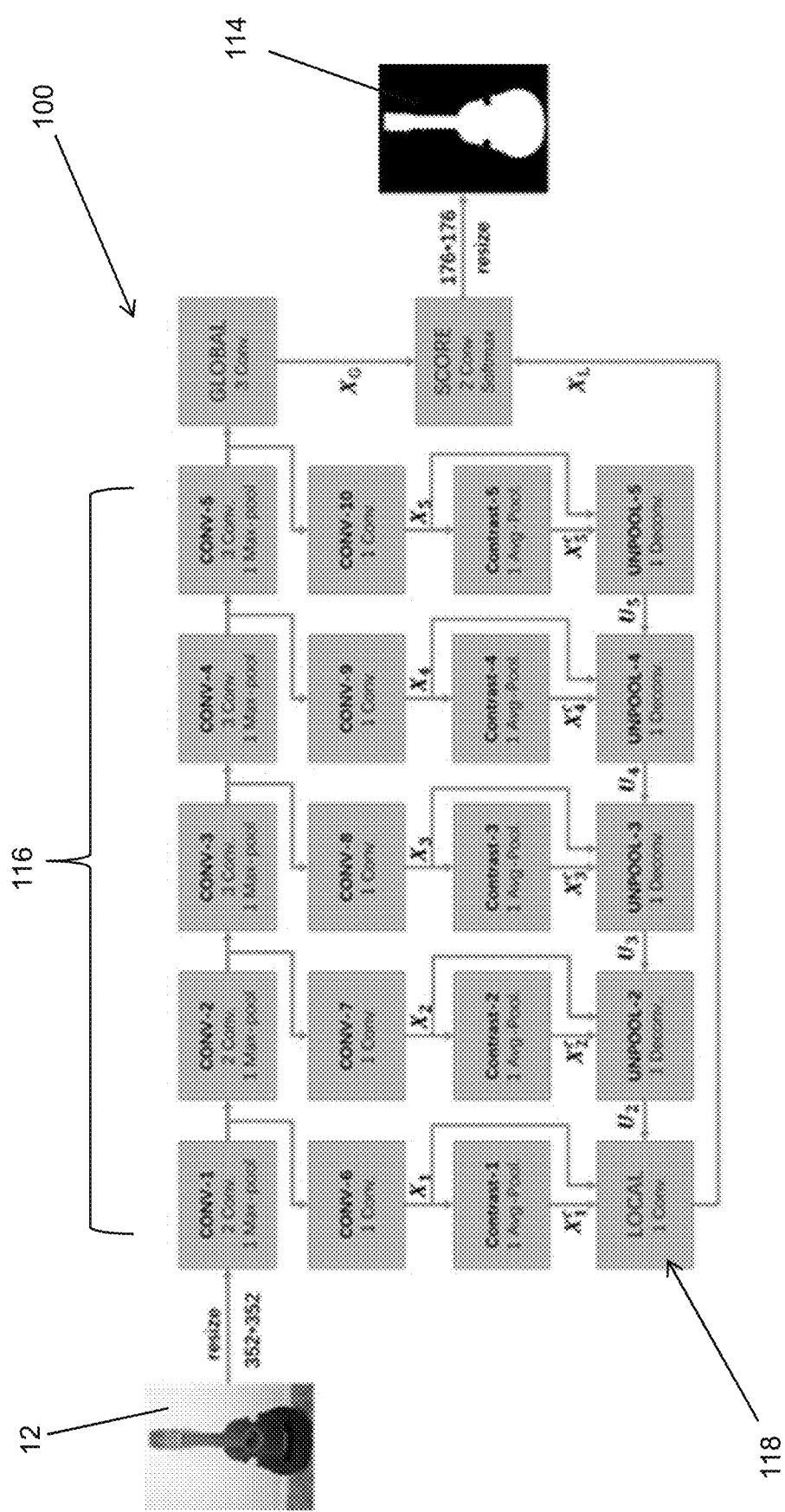
FIG. 4 is a schematic diagram illustrating another DAC network architecture.

Another DAC architecture 100 is shown in FIG. 4. When compared to the architecture 10 shown in FIG. 1, in the architecture 100 the neural network explicitly predicts the probability that certain pixels belong to a boundary. This can provide a marked improvement in edge fidelity and foreground accuracy when adopted. The output resolution of the network according to the architecture shown in FIG. 4 is relatively larger than that shown in FIG. 1, which can generate sharper features. The architecture in FIG. 4 also uses residual connections to allow information from earlier in the network to flow more readily to deeper levels of the network, and conversely for training (where backward connections are used) to occur more quickly due to such residual connections in the network.

When compared to the architecture shown in FIG. 1, it can be seen that the above-noted residual connections are made around the contrast blocks, and connections to the additional convolution blocks are made after each of the first set of convolution layers 116. CONV-9 and CONV-10 can be considered similar to blocks extending from Pool4 and Pool5 in FIG. 1. The additional CONV-6, CON-7, and CONV-8 are provided to learn features at more scales than the architecture 10 shown in FIG. 1. The contrast layers can be included to improve uniformity of foreground and background signals. The contrast layers are applied for each scale to allow the network to learn relationships. Each contrast feature $X_i^c$ can be computed by subtracting $X_i$ from its local average. The UNPOOL layers can be used to upscale the inputs to regain some output resolution, but with learned features rather than just interpolation. This can be considered similar to the DECONV layers shown in FIG. 1. The SCORE block can be considered similar to $F_p$ shown in FIG. 1, yielding the final saliency map. The output 114 also has a higher resolution when compared to $F_p$ in FIG. 1. The global features that are generated are also simplified, without being split into u− and u+.

Figure 5:
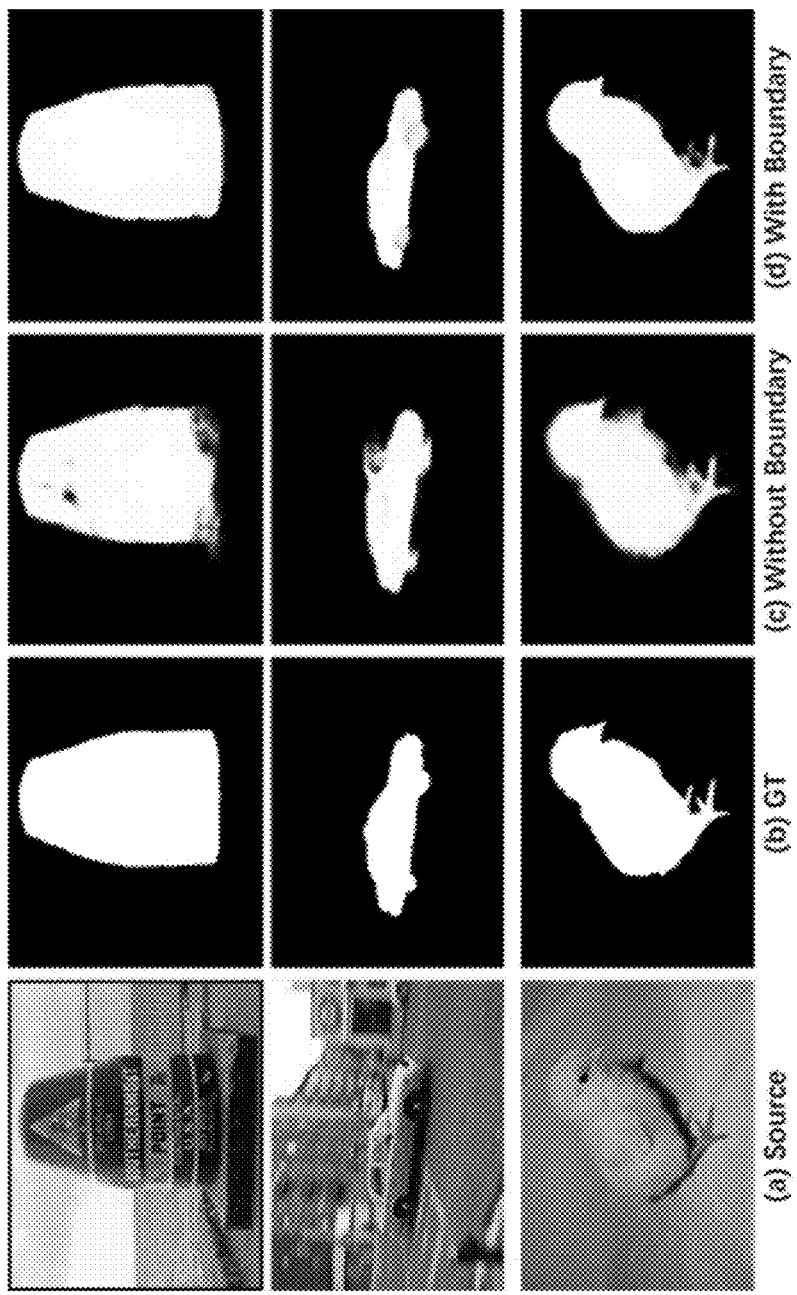
FIG. 5 provides a series of saliency maps comparing the use of a boundary according to the architecture shown in FIG. 4.

FIG. 5 illustrates the increased accuracy when including a boundary for three example images, comparing images (c) to (d) in relation to the ground truth (GT). The boundary can be computed on the output of the SCORE block (see FIG. 4) using a Sobel operator, followed by a tan h activation (not shown in FIG. 4). The network can be trained to make this prediction by using an intersection over union (IoU) loss:

$$IoU\ Loss = 1 - \frac{2|C_j \cap \hat{C}_j|}{|C_j| + |\hat{C}_j|}, \qquad (10)$$

The IoU loss, as defined above is 1 minus a value derived from 2 times the intersection of the true gradient [Cj] with the predicted gradient [Cj hat], divided by the union of the true and predicted gradients.

Figure 6:
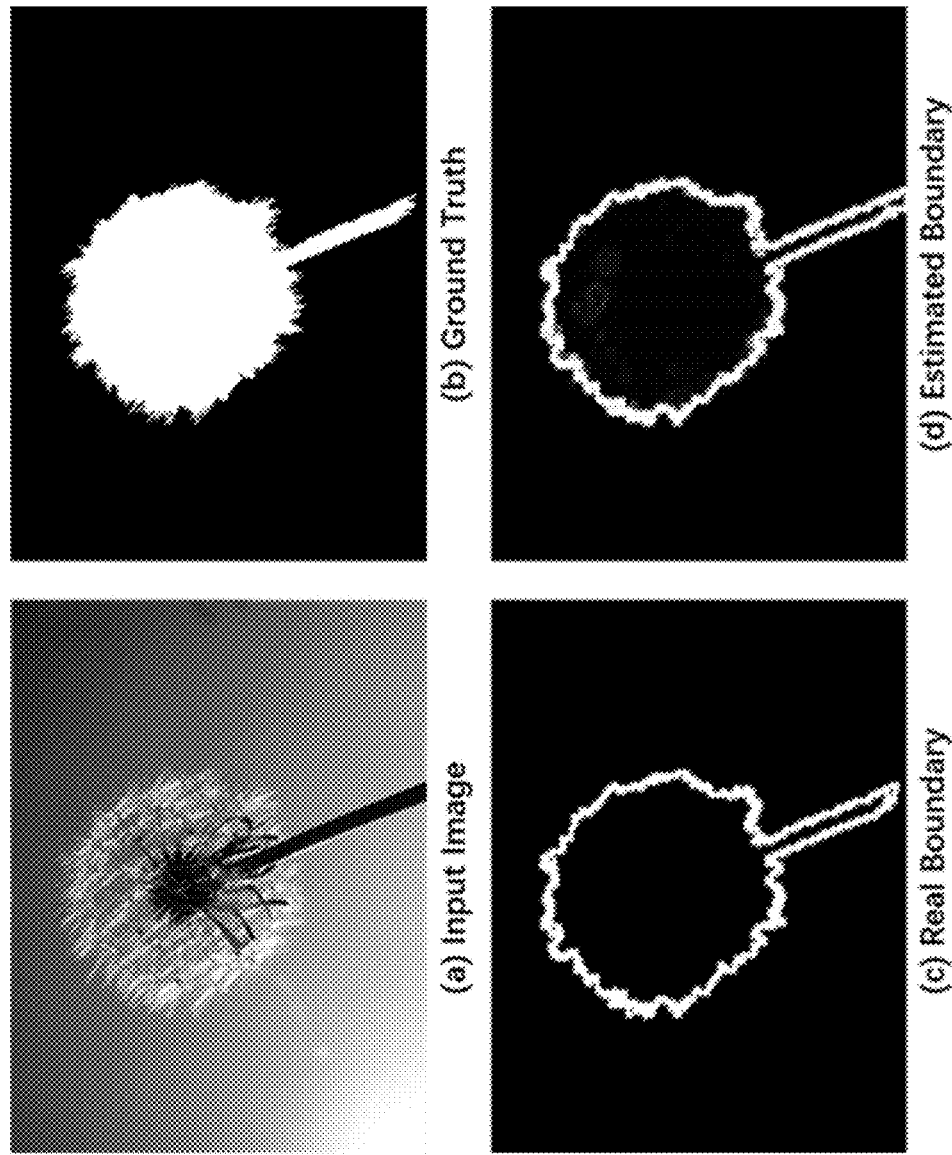
FIG. 6 illustrates a predicted boundary generated using the architecture shown in FIG. 4.

FIG. 6 demonstrates the generation of a saliency map that predicts a boundary for the flower in the input image (a).

It can be appreciated that the reduced-sized neural network described above can also be used with the implementation illustrated in FIG. 4.

Figure 7:
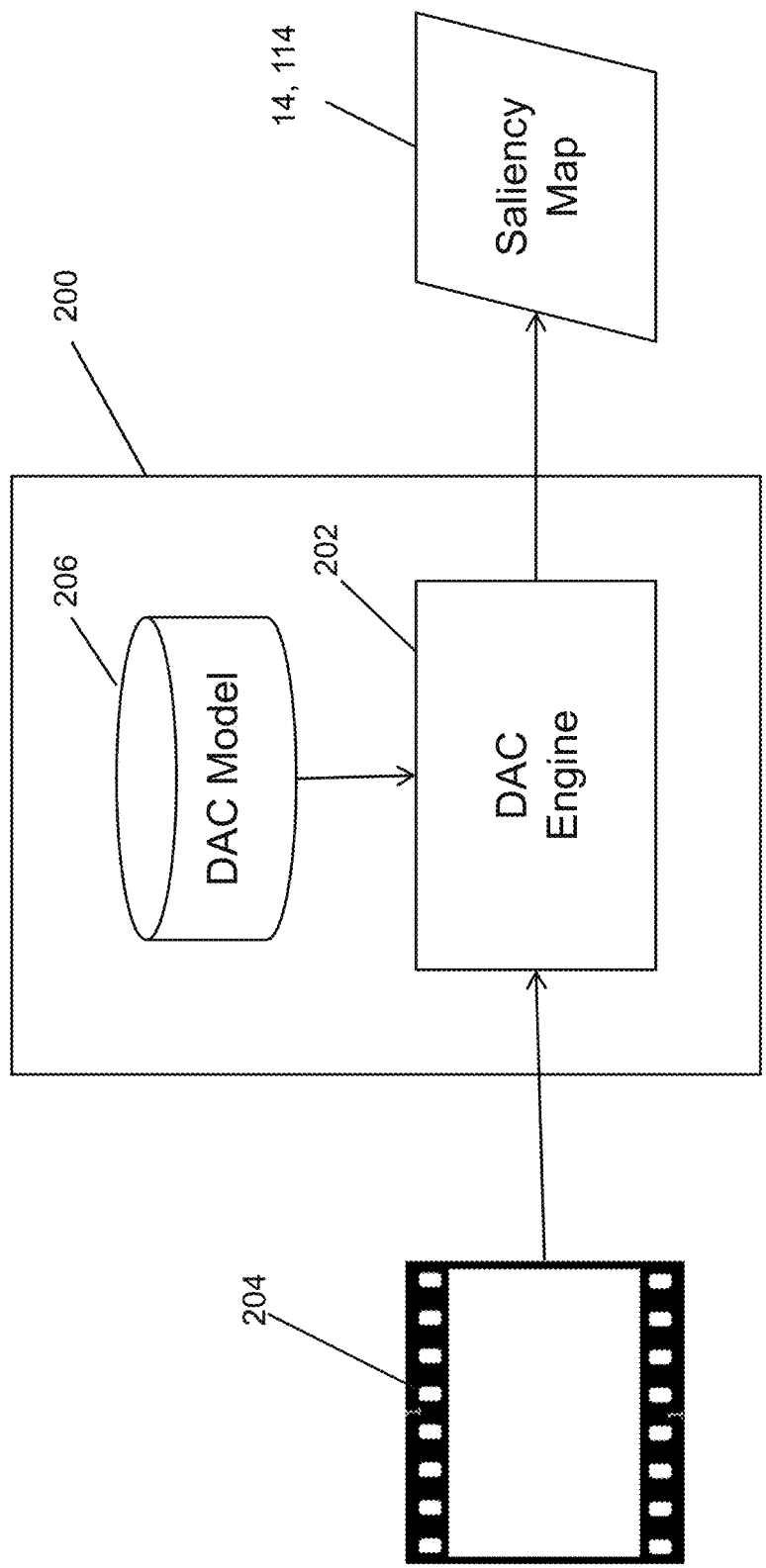
FIG. 7 is a block diagram of an example of a computing system implementing the DAC architectures shown in FIGS. 1 and/or 4.

Turning now to FIG. 7, a computer vision system 200 is shown, which can be implemented using any suitable computing hardware and/or software, in order to implement the DAC method described herein. The system 200 includes a DAC engine 202 that uses an image or images from a video 204 and a DAC model 206 to process the image as shown in FIGS. 1 and/or 4. The DAC engine generates an output 14, 114, e.g., comprising the saliency map ($F_p$), foreground objects ($F_+$), and background objects ($F_-$) as shown in FIG. 1 or output 114 shown in FIG. 4, the output 14, 114 being used to detect objects and events. For instance, the foreground output ($F_+$) can detect all vehicles in a scene that can be classified and tracked to produce a variety of traffic analytics. A vehicle driving down the wrong way can be detected or can automatically trigger a response from road safety teams. For stationary images, traffic camera data can be parsed to estimate traffic density and flow (from gap analysis), or parking lot data can be analyzed to estimate occupancy or direct drivers to empty parking spots. For surveillance applications, the foreground output can be associated with irregular events, which when detected can be sent to a human officer to assess a potential threat. In a more general level, the saliency output of the network can help computers recognize "significant" objects in the scene which the computer may be able to directly or indirectly interact, e.g. autonomous vehicles, drones, industrial robotic interactions or safety aspects.

For medical research and diagnoses, saliency can identify abnormal tissue or structures from medical images. The real-time aspects of the active contour described herein can allow medical practitioners to scan regions of the body in real-time via an in-vivo video stream. This enables things like live cell counting and density estimate applications, as an example.

Figure 8:
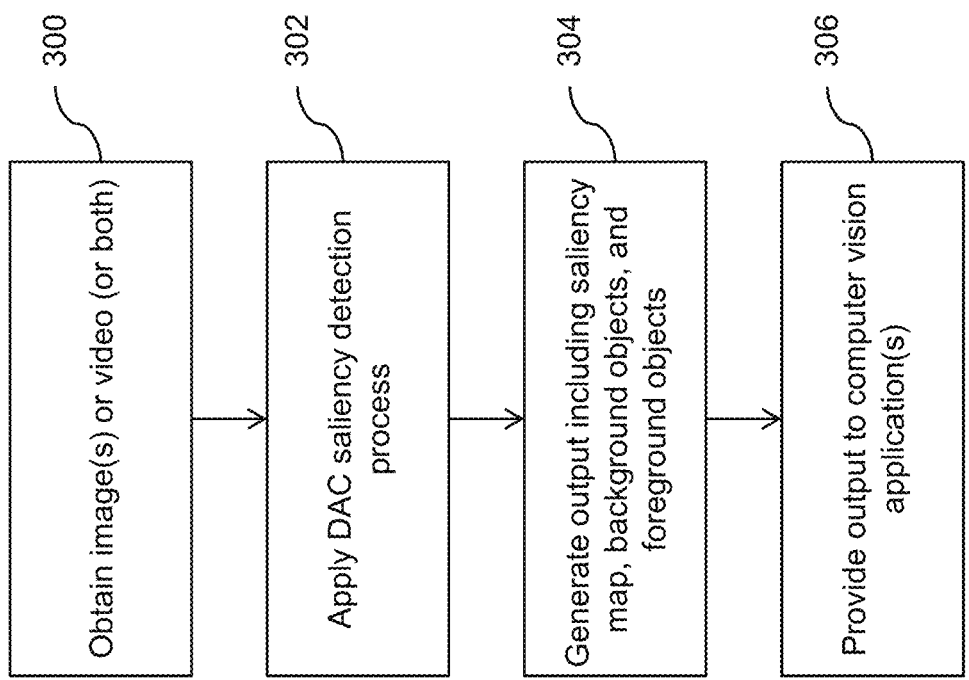
FIG. 8 is a flow chart illustrating example computer executable instructions for performing saliency detection on an image or video.

FIG. 8 provides a set of computer executable operations that can be performed by the DAC engine 202 to generate the saliency maps 14, 114 shown in FIG. 7. At step 300, the DAC engine 202 obtains a video and/or one or more images 204 to be processed and applies the DAC saliency detection process described herein at step 302, to generate an output 14, 114 at step 304, that contains the saliency map (Fp), and foreground (F+) and background (F−) objects. The output may then be provided to one or more computer vision-related applications as step 306.

The presently described DAC saliency detection process has particular utility in several industries and applications. For instance, in autonomous vehicles in which cameras are installed, the cameras can be used to identify and classify other vehicles around the autonomous vehicle. This data can be used for safety/feedback to the vehicle's control system.

In the area of pedestrian tracking, in a manner similar to vehicle tracking, the DAC engine 102 can be used to track, identify, classify, and count pedestrians. For example, this can be applied to perform pedestrian or bicycle counts, pedestrian detection at intersections, etc.

In the area of logistics, the presently described system and method can be used for applications such as warehouse automation, detecting and tracking objects (people and vehicles) moving through a warehouse, etc., to improve automation and efficiencies.

In the area of surveillance, the system can be implemented to use video streams from surveillance cameras to automatically identify behaviour that is deemed to be "suspect". For example, someone moving around a retail environment in the evening (outside of shopping hours), or someone moving beyond a barrier (e.g. door) where they have not been given permission or access.

Various other applications are also possible where saliency detection is useful or required.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computer vision system 100, any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] C. Guo and L. Zhang. A novel multiresolution spatiotemporal saliency detection model and its applications in image and video compression. IEEE Trans. Image Process., 19(1):185-198, January 2010.

[2] G. Li and Y. Yu. Visual saliency based on multiscale deep features. In Proc. CVPR, 2015.

[3] R. Zhao, W. Ouyang, H. Li, and X. Wang. Saliency detection by multi-context deep learning. In Proc. CVPR, 2015.

[4] T. F. Chan and L. A. Vese. A multiphase level set framework for image segmentation using the Mumford and Shah model. Int. J. Comput. Vision, 50(3):271-293, 2002.

[5] R. Malladi, J. A. Sethian, and B. C. Vemuri. Shape modeling with front propagation: a level set approach. IEEE Trans. Pattern Anal. Mach. Intell., 17(2):158-175, February 1995.

[6] T. F. Chan and L. A. Vese. Active contours without edges. IEEE Trans. Image Process., 10(2):266-277, February 2001.

[7] M. Kass, A. Witkin, and D. Terzopoulos. Snakes: Active contour models. Int. J. Comput. Vision, 1(4):321-331, 1988.

[8] D. Mumford and J. Shah. Optimal approximations by piecewise smooth functions and associated variational problems. Communications on Pure and Applied Mathematics, 42(5):577-685, July 1989.

[9] A. Krizhevsky, S. Ilya, and Hinton G. ImageNet classification with deep convolutional neural networks. In NIPS. 2012.

[10] Y. Bengio, A. Courville, and P. Vincent. Representation learning: A review and new perspectives. IEEE Trans. Pattern Anal. Mach. Intell., 35(8):1798-1828, August 2013.

[11] Y. LeCun, Y. Bengio, and G. Hinton. Deep learning. Nature, 521(7553):436-444, 05 2015.

[12] J. Weston, F. Ratle, H. Mobahi, and R. Collobert. Neural Networks: Tricks of the Trade: Second Edition, pages 639-655. Springer Berlin Heidelberg, 2012.

[13] L. Wang, H. Lu, X. Ruan, and M. Yang. Deep networks for saliency detection via local estimation and global search. In Proc. CVPR, 2015.

[14] S. Zhang, S. Jayasumana, B. Romera-Paredes, V. Vineet, Z. Su, D. Du, C. Huang, and P. H. S. Torr. Conditional random fields as recurrent neural networks. In Proc. ICCV, 2015.

[15] T. Liu, Z. Yuan, J. Sun, J. Wang, N. Zheng, X. Tang, and H. Shum. Learning to detect a salient object. IEEE Trans. Pattern Anal. Mach. Intell., 33(2):353-367, 2011.

[16] Y. Li, X. Hou, C. Koch, J. Rehg, and A. Yuille. The secrets of salient object segmentation. In Proc. CVPR, 2014.

[17] C. Yang, L. Zhang, H. Lu, X. Ruan, and M. Yang. Saliency detection via graph-based manifold ranking. In Proc. CVPR, 2013.

[18] P. Krähenbühl and V. Koltun. Geodesic object proposals. In Proc. ECCV, 2014.

[19] J. Long, E. Shelhamer, and T. Darrell. Fully convolutional networks for semantic segmentation. In Proc. CVPR, 2015.

[20] K. Simonyan and A. Zisserman. Very deep convolutional networks for large-scale image recognition. CoRR, abs/1409.1556, 2014.

[21] D. Kingma and J. Ba. Adam: A method for stochastic optimization. arXiv preprint arXiv:1412.6980, 2014.

[22] R. Achanta, S. Hemami, F. Estrada, and S. Susstrunk. Frequency-tuned salient region detection. In Proc. CVPR, 2009.

[23] F. Perazzi, P. Krähenbühl, Y. Pritch, and A. Hornung. Saliency filters: Contrast based filtering for salient region detection. In Proc. CVPR, 2012.

[24] Y. Qin, H. Lu, Y. Xu, and H. Wang. Saliency detection via cellular automata. In Proc. CVPR, 2015.

The invention claimed is:

1. A method of detecting object boundaries, the method comprising:
    obtaining an input image;
    processing the input image using a series of input layers in a deep neural network to obtain a set of global features;
    using outputs of a plurality of the input layers to perform edge detection at different scales and combining the outputs to obtain a set of local features;
    combining the global and local features and applying an optimization function that has been trained to minimize intra-class variance and maximize inter-class variance according to one or more active contour energy constraints, to enhance at least one object boundary from the input image; and
    providing an output comprising the at least one object boundary.

2. The method of claim 1, wherein the output is provided in real-time.

3. The method of claim 1, wherein the deep neural network has sufficient depth to produce a saliency map for the input image with sufficient resolution for an application utilizing the output.

4. The method of claim 1, wherein the deep neural network has a structure analogous to active contour energy constraints, to produce active contours for objects through a minimization of energy cost functions, using the deep neural network.

5. The method of claim 1, wherein the output is used for any one of: object detection, localization, lane or roadway identification, or segmentation for computer vision applications.

6. The method of claim 1, being applied in place of an existing active contour application to provide training and scalability from the deep neural network implementation.

7. The method of claim 1, for enabling real-time active contour applications related to real-world images and/or videos.

8. The method of claim 1, wherein the output is used to detect and/or segment vehicles and/or pedestrians for traffic analysis.

9. The method of claim 1, wherein the output is used to detect and/or segment normal and/or abnormal medical structures from imagery or video, in both visible and non-visible bands.

10. The method of claim 1, wherein the output is used to provide industrial quality control by detecting defects or verifying components in a manufacturing process.

11. The method of claim 1, wherein the output is used to identify and classify other vehicles in an autonomous vehicle.

12. The method of claim 1, wherein the output is used to track, identify, classify and/or count pedestrians.

13. The method of claim 1, wherein the output is used to detect or track objects moving through a warehouse.

14. The method of claim 1, wherein the output is used to identify behaviour in a surveillance system.

15. A non-transitory computer readable medium comprising computer executable instructions for detecting object boundaries, comprising instructions for:
    obtaining an input image;
    processing the input image using a series of input layers in a deep neural network to obtain a set of global features;
    using outputs of a plurality of the input layers to perform edge detection at different scales and combining the outputs to obtain a set of local features;
    combining the global and local features and applying an optimization function that has been trained to minimize intra-class variance and maximize inter-class variance according to one or more active contour energy constraints, to enhance at least one object boundary from the input image; and providing an output comprising the at least one object boundary.

16. A computer vision system comprising:

an engine configured for receiving images and/or video; and a memory comprising computer executable instructions for detecting object boundaries, comprising instructions for:

obtaining an input image;

processing the input image using a series of input layers in a deep neural network to obtain a set of global features;

using outputs of a plurality of the input layers to perform edge detection at different scales and combining the outputs to obtain a set of local features;

combining the global and local features and applying an optimization function that has been trained to minimize intra-class variance and maximize inter-class variance according to one or more active contour energy constraints, to enhance at least one object boundary from the input image; and providing an output comprising the at least one object boundary.

17. The system of claim 16, wherein the deep neural network has sufficient depth to produce a saliency map for the input image with sufficient resolution for an application utilizing the output.

18. The system of claim 16, wherein the deep neural network has a structure analogous to active contour energy constraints, to produce active contours for objects through a minimization of energy cost functions, using the deep neural network.

19. The system of claim 16, being applied in place of an existing active contour application to provide training and scalability from the deep neural network implementation.

20. The system of claim 16, for enabling real-time active contour applications related to real-world images and/or videos.

* * * * *